(12) United States Patent
Kollias (10) Patent No.: US 9,796,218 B2
(45) Date of Patent: Oct. 24, 2017

(54) BEAD OF A TIRE FOR A HEAVY VEHICLE OF THE CONSTRUCTION PLANT TYPE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Athanase Kollias, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 221 days.

(21) Appl. No.: 14/652,440

(22) PCT Filed: Dec. 11, 2013

(86) PCT No.: PCT/EP2013/076194
§ 371 (c)(1),
(2) Date: Jun. 15, 2015

(87) PCT Pub. No.: WO2014/090862
PCT Pub. Date: Jun. 19, 2014

(65) Prior Publication Data
US 2015/0321524 A1    Nov. 12, 2015

(30) Foreign Application Priority Data

Dec. 13, 2012   (EP) ...................................... 1261999

(51) Int. Cl.
*B60C 15/00* (2006.01)
*B60C 15/06* (2006.01)
(Continued)

(52) U.S. Cl.
CPC ............ *B60C 15/0603* (2013.01); *B60C 5/00* (2013.01); *B60C 9/0292* (2013.01);
(Continued)

(58) Field of Classification Search
CPC ............ B60C 15/0009; B60C 15/0036; B60C 15/0054; B60C 15/0063; B60C 15/0607
See application file for complete search history.

(56) References Cited

U.S. PATENT DOCUMENTS 5,236,031 A    8/1993   Honbo et al.
6,109,320 A *  8/2000   Miyazaki ............. B60C 15/024
                                                       152/539
(Continued)

FOREIGN PATENT DOCUMENTS

EP    2 216 189         8/2010
JP    02-267012      * 10/1990
(Continued)

OTHER PUBLICATIONS

English machine translation of JP2006-069290, no date.*
English machine translation of JP04-218414, no date.*
English machine translation of JP02-267012, no date.*

*Primary Examiner* — Robert Dye
(74) *Attorney, Agent, or Firm* — Cozen O'Connor (57) ABSTRACT

Improving endurance of bead of radial tire for heavy vehicle. Tire has two beads (2) contacting rim (3) connected by carcass reinforcement (4) having carcass layer (5), with main part (6) wrapped, in each bead (2), axially from inside towards outside of the tire, around bead wire (7) having diameter (L), to form turnup (8) having free end (E). Each bead (2) has filling element (9) with filling compound (10) and extending radially towards outside from bead wire (7) and axially between turnup (8) and main part (6). The distance (I) between turnup (8) and main part (6) decreases continuously from bead wire (7) as far as a first minimum (Continued)

distance (a) reached at a first point (A) of turnup (8), then increases continuously from the first point (A) of turnup (8) as far as a first maximum distance (b) reached at a second point (B) of turnup (8).

15 Claims, 3 Drawing Sheets

(51) Int. Cl.
*B60C 5/00* (2006.01)
*B60C 9/02* (2006.01)

(52) U.S. Cl.
CPC ...... *B60C 15/0009* (2013.01); *B60C 15/0036* (2013.01); *B60C 15/0063* (2013.01); *B60C 15/0607* (2013.01); *B60C 2015/009* (2013.01); *B60C 2015/061* (2013.01); *B60C 2200/065* (2013.01)

(56) References Cited

U.S. PATENT DOCUMENTS

| | | | |
|---|---|---|---|
| 2010/0252164 A1* | 10/2010 | Oogane | B60C 15/0027 152/556 |
| 2013/0174956 A1* | 7/2013 | Toyoda | B60C 15/0036 152/541 |

FOREIGN PATENT DOCUMENTS

| | | | |
|---|---|---|---|
| JP | 04-218414 | * | 8/1992 |
| JP | 2000-225816 | * | 8/2000 |
| JP | 2006-069290 | * | 3/2006 |
| JP | 2006-347467 | * | 12/2006 |
| JP | 2009-018669 | * | 1/2009 |
| JP | 2010 274862 | | 12/2010 |
| JP | 2012-001022 | * | 1/2012 |
| KR | 20070002823 | * | 1/2007 |
| WO | WO 2012/017673 | | 2/2012 |
| WO | WO2012/036292 | * | 3/2012 |

* cited by examiner

BEAD OF A TIRE FOR A HEAVY VEHICLE OF THE CONSTRUCTION PLANT TYPE

RELATED APPLICATIONS

This is a U.S. National stage of International application No. PCT/EP2013/076194 filed on Dec. 11, 2013.

This patent application claims the priority of French application no. 1261999 filed Dec. 13, 2012 the disclosure content of which is hereby incorporated by reference.

FIELD OF THE INVENTION

The present invention relates to a radial tire intended to be fitted to a heavy vehicle of the construction plant type.

Although not restricted to this type of application, the invention will be more particularly described with reference to a large-sized radial tire intended, for example, to be mounted on a dumper, a vehicle for transporting materials extracted from quarries or surface mines. The nominal rim diameter of such a tire, within the meaning of the European Tire and Rim Technical Organisation or ETRTO standard, is at least equal to 25 inches.

BACKGROUND OF THE INVENTION

A tire comprises two beads which provide the mechanical connection between the tire and the rim on which it is mounted, the beads being respectively connected by two sidewalls to a tread which is intended to come into contact with the ground via a tread surface.

In what follows, the circumferential, axial and radial directions respectively denote a direction tangential to the tread surface in the direction of rotation of the tire, a direction parallel to the axis of rotation of the tire, and a direction perpendicular to the axis of rotation of the tire. "Radially on the inside" and "radially on the outside" respectively mean "closer to" and "further away from" the axis of rotation of the tire. "Axially on the inside" and "axially on the outside" respectively mean "closer to" and "further away from" the equatorial plane of the tire, the equatorial plane of the tire being the plane passing through the middle of the tread surface of the tire and perpendicular to the axis of rotation of the tire.

A radial tire more particularly comprises a reinforcement comprising a crown reinforcement radially on the inside of the tread and a carcass reinforcement radially on the inside of the crown reinforcement.

The carcass reinforcement of a radial tire for a heavy vehicle of the construction plant type usually comprises at least one carcass layer consisting of reinforcers, generally made of metal, coated in an elastomeric coating material or coating compound. In the field of tires, an elastomeric material usually obtained by blending components of the material is usually referred to as a compound. The carcass layer comprises a main part connecting the two beads together and wrapped, within each bead, from the inside towards the outside of the tire, around a bead wire to form a turnup. The metal reinforcers are substantially parallel to one another and make with the circumferential direction an angle of between 85° and 95°, in the case of the main part, and an angle of between 75° and 105°, in the case of the turnup.

The bead wire is made up of a circumferential reinforcing element, generally made of metal, surrounded with at least a coating material, nonexhaustively made of elastomer or textile. In what follows, the diameter of the bead wire is the name given to the diameter of the substantially circular meridian section of the bead wire which is the diameter of the circle circumscribed around the meridian section of the bead wire, which consists of the metal circumferential reinforcing element surrounded by its coating element. The portion of bead wire in contact with the carcass reinforcement contributes to reacting tensile forces in the carcass reinforcement upon inflation, by coupling with the carcass reinforcement. This contribution to the reaction of tensile forces is dependent on the torsional stiffness of the bead wire and on the length of the turnup. In the usual scenario in which the bead wire has high torsional stiffness, the tensile forces upon inflation are essentially reacted via the bead wire, with the turnup making a secondary contribution.

The turnup in each bead allows the carcass layer to be anchored to the bead wire in that bead. In the case of a tire for a heavy vehicle of the construction plant type, the turnup is generally long, i.e. its free end is radially closer to the axially outermost point of the carcass reinforcement in the sidewall of the tire than to the axially outermost point of the bead wire.

Each bead also comprises a filling element extending the bead wire radially outwards and of substantially triangular shape. The filling element is made of at least one filling elastomeric material or filling compound and often made up of a stack, in the radial direction, of at least two filling compounds with different chemical compositions. Furthermore, the filling element axially separates the main part from the turnup.

A compound, after curing, is characterized mechanically by tensile stress-strain characteristics which are determined by tensile testing. This tensile testing is carried out by a person skilled in the art, on a test specimen, using a known method, for example in accordance with international standard ISO 37, and under normal temperature (23+ or −2° C.) and relative humidity (50+ or −5% rh) conditions defined by international standard ISO 471. The elastic modulus at 10% elongation for a compound, and expressed in mega pascals (MPa), is the name given to the tensile stress measured for a 10% elongation of the test specimen.

A compound, after curing, is also characterized mechanically by its hardness. The hardness is notably defined by the Shore A hardness determined in accordance with standard ASTM D 2240-86.

When the vehicle is driving along, the tire, mounted on its rim, inflated and compressed under the load of the vehicle, is subjected to bending cycles, particularly at its bead and at its sidewalls.

The bending cycles lead in particular to stresses and strains, mainly in shear and in compression, in the filling compounds, because of the flexing of the bead on the rim flange.

Document EP 2216189 describes a tire bead the endurance of which is improved by reducing the compressive strains in the turnup as the bead flexes on the rim in use. This objective is achieved by a turnup which is such that the distance between the turnup and the main part decreases continuously, radially towards the outside, from the bead wire as far as a minimum distance and then increases continuously as far as a maximum distance. The turnup extends radially on the outside of the point of the turnup that corresponds to the maximum distance between the turnup and the main part.

Document JP 2010274862 also describes a tire bead the endurance of which is improved, as the bead flexes on the rim in use, in the case of a bead, as described by document EP 2216189, with a turnup that is such that the distance between the turnup and the main part decreases continuously, radially towards the outside, from the bead wire as far as a minimum distance, then increases continuously as far as a maximum distance. This objective is achieved by virtue of the presence of a filling element between the main part and the turnup, comprising a hard first compound extending radially towards the outside from the bead wire, and a second filling compound extending radially towards the outside from the hard first compound. The second filling compound is present at least in part in the region in which the distance between the main part and the turnup is minimum. This design makes it possible to decrease shear forces in this region and therefore improve the endurance of the bead further.

In the technical solutions described respectively by the aforementioned documents EP 2216189 and JP 2010274862, a turnup such that the distance between the turnup and the main part decreases continuously, radially towards the outside, from the bead wire as far as a minimum distance, causes the turnup to be brought significantly closer to the main part of the carcass layer.

This meridian profile of turnup makes it possible to reduce the compression in the turnup, or even place it under tension, because the assembly consisting of the turnup, the filling element and the main part of the carcass layer behaves mechanically like a beam the cross section of which decreases radially towards the outside.

Moreover, bringing the turnup closer to the main part leads to a corresponding thickening of the portion of bead axially on the outside of the turnup and consisting of at least one compound. This thickening leads to a reduction in shear loadings at the interface between the axially outer compound adjacent to the turnup and the turnup, and therefore leads to better fatigue strength of this interface, this contributing to improving the endurance of the tire.

On the other hand, bringing the turnup closer to the main part leads to a reduction in thickness of the filling element interposed axially between the turnup and the main part of the carcass layer. This reduction in thickness leads to an increase in shear loadings at the interface between the filling element and the main part of the carcass layer, and therefore to lower fatigue strength of this interface, this contributing to impair the endurance of the tire.

SUMMARY OF THE INVENTION

One object of the invention is to improve the endurance of the beads of a radial tire for a heavy vehicle of the construction plant type still further in order to overcome the above-mentioned disadvantage while at the same time maintaining the observed technical advantages.

This object has been achieved, according to an aspect of the invention, by a tire for a heavy vehicle of the construction plant type, comprising:

two beads intended to come into contact with a rim and connected to one another by a carcass reinforcement comprising at least one carcass layer, the or each carcass layer comprising a main part wrapped, in each bead, axially from the inside towards the outside of the tire, around a bead wire having a diameter, to form a turnup having a free end, each bead comprising a filling element comprising at least one filling compound and extending radially towards the outside from the bead wire and axially between the turnup and the main part, the distance between the turnup and the main part decreasing continuously from the bead wire as far as a first minimum distance reached at a first point of the turnup, then increasing continuously from the first point of the turnup as far as a first maximum distance reached at a second point of the turnup, the distance between the turnup and the main part decreasing continuously from the second point of the turnup as far as a second minimum distance reached at a third point of the turnup radially on the inside of the free end of the turnup, and the distance between the turnup and the main part increases continuously from the third point of the turnup as far as a second maximum distance reached at a fourth point of the turnup that is radially on the inside of the free end of the turnup.

By convention, the distance between the turnup and the main part, at a given point on the turnup, is measured between the respective mean lines of the turnup and of the main part, and at right angles to the turnup. From a practical standpoint, this distance at a given point on the turnup is measured on a meridian section of the tire.

The essential idea behind the invention is to have a filling element, separating the turnup from the main part, comprising a first narrowing, followed by a first widening, followed by a second narrowing, itself followed by a second widening. In other words, the meridian profile of the turnup has a waviness located in that portion of the bead that is highly loaded mechanically as the bead flexes on the rim flange during use. This design makes it possible to guarantee a compromise in terms of endurance between three potentially sensitive regions.

The first sensitive region is the interface between the axially outer compound adjacent to the turnup and the turnup. The first minimum distance reached at a first point of the turnup, positioned in this first sensitive region, leads to a local thickening of the portion of bead axially on the outside of the turnup. This local thickening leads to a reduction in shear loadings at the interface between the axially outer compound adjacent to the turnup and the turnup, and therefore better fatigue strength of this interface, thus contributing to improving the endurance of the tire.

The second sensitive region is the interface between the filling element and the main part of the carcass layer. The first axial distance reached at a second point of the turnup, positioned in this second sensitive region, leads to a local thickening of the filling element. This local thickening leads to a reduction in the shear loadings at the interface between the filling element and the main part of the carcass layer and therefore leads to better fatigue strength of this interface, likewise contributing to improving the endurance of the tire.

The third sensitive region is the turnup portion subjected to compression. This turnup portion corresponds substantially to the portion of bead wrapped over the rim flange and, more specifically, over the substantially circular and radially outer portion of the rim flange, as the tire is driven on. In this bead portion, which behaves like a beam in bending, the main part, which can be likened to the outer fibre of the beam, is in tension whereas the turnup, which can be likened to the inner fibre of the beam, is in compression. A second minimum distance reached at a third point of the turnup radially on the inside of the free end of the turnup allows the distance between the turnup and the main part, i.e. the distance between the outer and inner fibres of the beam, to be reduced locally, this making it possible to reduce the extent to which the inner fibre, i.e. the turnup, is compressed.

Finally, the distance between the turnup and the main part increases continuously from the third point of the turnup as far as a second maximum distance reached at a fourth point of the turnup radially on the inside of the free end of the turnup and positioned radially on the outside of the radially innermost point of the bead wire at a radial distance.

The first minimum distance reached at the first point of the turnup is advantageously at most equal to the second minimum distance reached at the third point of the turnup.

The first minimum distance reached at the first point of the turnup is preferably at least equal to 0.1 times and at most equal to 0.2 times the diameter of the bead wire.

With the first point of the turnup being radially positioned on the outside of a radially innermost point of the bead wire at a given radial distance, the radial distance between the first point of the turnup and the radially innermost point of the bead wire is also preferably at least equal to 1.5 times and at most equal to 2 times the diameter of the bead wire.

The range of values for the first minimum distance and the range of values for the radial position of the first point of the turnup, corresponding to the first minimum distance, as previously defined, make it possible to minimize the shear loadings in the first sensitive region, at the interface between the axially outer compound adjacent to the turnup and the turnup.

The first maximum distance reached at the second point of the turnup is at least equal to 1.2 times and at most equal to 2.5 times the first minimum distance reached at the first point of the turnup.

With the second point of the turnup being radially positioned on the outside of a radially innermost point of the bead wire at a given radial distance, the radial distance between the second point of the turnup and the radially innermost point of the bead wire is at least equal to 1.55 times and at most equal to 2.2 times the diameter of the bead wire.

The range of values for the first maximum distance and the range of values for the radial position of the second point of the turnup, corresponding to the first maximum distance, as previously defined, make it possible to minimize the shear loadings in the second sensitive region, at the interface between the filling element and the main part of the carcass layer.

The second minimum distance reached at the third point of the turnup is at least equal to 0.5 times, preferably at least equal to 1 times, and at most equal to 2.4 times the first minimum distance reached at the first point of the turnup.

With the third point of the turnup being radially positioned on the outside of a radially innermost point of the bead wire at a given radial distance, the radial distance between the third point of the turnup and the radially innermost point of the bead wire (7) is at least equal to 1.8 times and at most equal to 2.5 times the diameter of the bead wire.

The range of values for the second minimum distance and the range of values for the radial position of the third point of the turnup, corresponding to the second minimum distance, as previously defined, make it possible to minimize the compressive loadings in the second sensitive region corresponding to the portion of turnup subjected to compression, by placing the turnup under tension.

It is further advantageous that, with the fourth point of the turnup being radially positioned on the outside of the radially innermost point of the bead wire at a given radial distance, the radial distance between the fourth point of the turnup and the radially innermost point of the bead wire be at least equal to 1.5 times the radial distance between the first point of the turnup and the radially innermost point of the bead wire.

This second maximum distance which corresponds to a second maximum thickness of the filling element also makes it possible to reduce shear loadings in the filling element. In this embodiment, the thickness of the filling element thus passes successively through a first minimum, then a first maximum, then a second minimum and finally a second maximum: this means there is a double wave in the turnup.

With the free end of the turnup being positioned radially on the outside of the radially innermost point of the bead wire at a given radial distance, and the axially outermost point, of the main part, being positioned radially on the outside of the radially innermost point of the bead wire at a given radial distance, the radial distance between the free end of the turnup and the radially innermost point of the bead wire is at least equal to 0.8 times the radial distance between the axially outermost point, of the main part, and the radially innermost point of the bead wire. In other words, the radial positioning of the free end of the turnup is close to that of the axially outermost point of the main part. This axially outermost point of the main part, at which the tangent to the main part is radial, defines the axial width of the tire at the sidewall. This radial positioning of the end of the turnup is characteristic of a turnup referred to as a long turnup. A long turnup contributes to reacting the tensile forces upon inflation in the carcass reinforcement layer provided that the torsional stiffness of the bead wire is sufficiently low. Depending on whether the end of the turnup is positioned radially on the inside or radially on the outside of the axially outermost point of the carcass reinforcement, the end of the turnup may, as the sidewall flexes during running, either be pulled radially outwards and placed under tension or, on the other hand, pushed radially inwards and placed under compression. Therefore the radial positioning of the end of the turnup dictates whether or not the turnup is placed in compression.

When the filling element comprises a first filling compound and a second filling compound at least partially in contact with one another, with the first filling compound extending radially towards the outside from the bead wire as far as a radially outermost point of the first filling compound and in contact with the main part, the said point being radially positioned on the outside of a radially innermost point of the bead wire at a given radial distance, and the first filling compound having an elastic modulus at 10% elongation at least equal to the elastic modulus at 10% elongation of the second filling compound, the radial distance between the radially outermost point, of the first filling compound and in contact with the main part, and the radially innermost point of the bead wire is at most equal to the radial distance between the first point of the turnup, corresponding to the first minimum distance, and the radially innermost point of the bead wire.

That leads to the presence of a second filling compound having a lower elastic modulus at 10% elongation, in the region of local thickening, delimited by the two narrowings; this in turn leads to an additional reduction in the shear loadings in the beam and therefore in the risk of rupture or decohesion at the interface between the filling element and the main part of the carcass layer.

The second filling compound extends radially towards the outside from the bead wire, along the turnup, and axially towards the inside from the turnup, in contact with the bead wire.

The region of the interface between the filling element and the turnup, radially on the outside of the bead wire, is also a region sensitive to decohesion. The presence of a second filling compound, having an elastic modulus at 10% elongation that is lower than that of the first filling compound, makes it possible to reduce the shear stresses in this interface region and therefore make it less sensitive to decohesion.

According to a preferred alternative form of the previous embodiment, with the axially innermost point of the second filling compound, that is also in contact with the bead wire, being axially positioned on the inside of the turnup at a given axial distance, the axial distance between the axially innermost point of the second filling compound, that is also in contact with the bead wire, and the turnup is at least equal to 0.15 times and at most equal to 0.35 times the diameter of the bead wire.

As far as the range of values defined hereinabove is concerned, the minimum value guarantees minimal effectiveness of this solution whereas the maximum value guarantees that the overall shear stiffness of the filling element remains high enough to avoid any risk of the carcass layer becoming deradialized.

Advantageously, with the or each carcass layer being made up of mutually parallel reinforcers coated in a coating compound, the elastic modulus at 10% elongation of the second filling compound is at least equal to 0.75 times the elastic modulus at 10% elongation of the coating compound, preferably at least equal to the elastic modulus at 10% elongation of the coating compound.

If the second filling compound had an elastic modulus at 10% elongation lower than this value, that would increase the risk of rupture or decohesion of the interface between the first and second filling compounds as a result of too great a difference between their respective moduli of elasticity at 10% elongation.

If the respective moduli of elasticity at 10% elongation of the second filling compound and of the coating compound are the same, there is no stiffness gradient at the interface between the coating compound and the second filling compound: this desensitizes this interface region with respect to decohesion.

The elastic modulus at 10% elongation of the first filling compound is, for its part, advantageously at least equal to the elastic modulus at 10% elongation of the coating compound.

The second filling compound advantageously has the same chemical composition as the coating compound. The cohesion of the interface between the two compounds is further improved by the fact that their chemical compositions are identical.

BRIEF DESCRIPTION OF THE DRAWINGS

The features of the invention will be better understood with the aid of the description of the attached FIGS. 1 to 3 which are simplified depictions not drawn to scale.

DETAILED DESCRIPTION OF THE DRAWINGS

Figure 1:
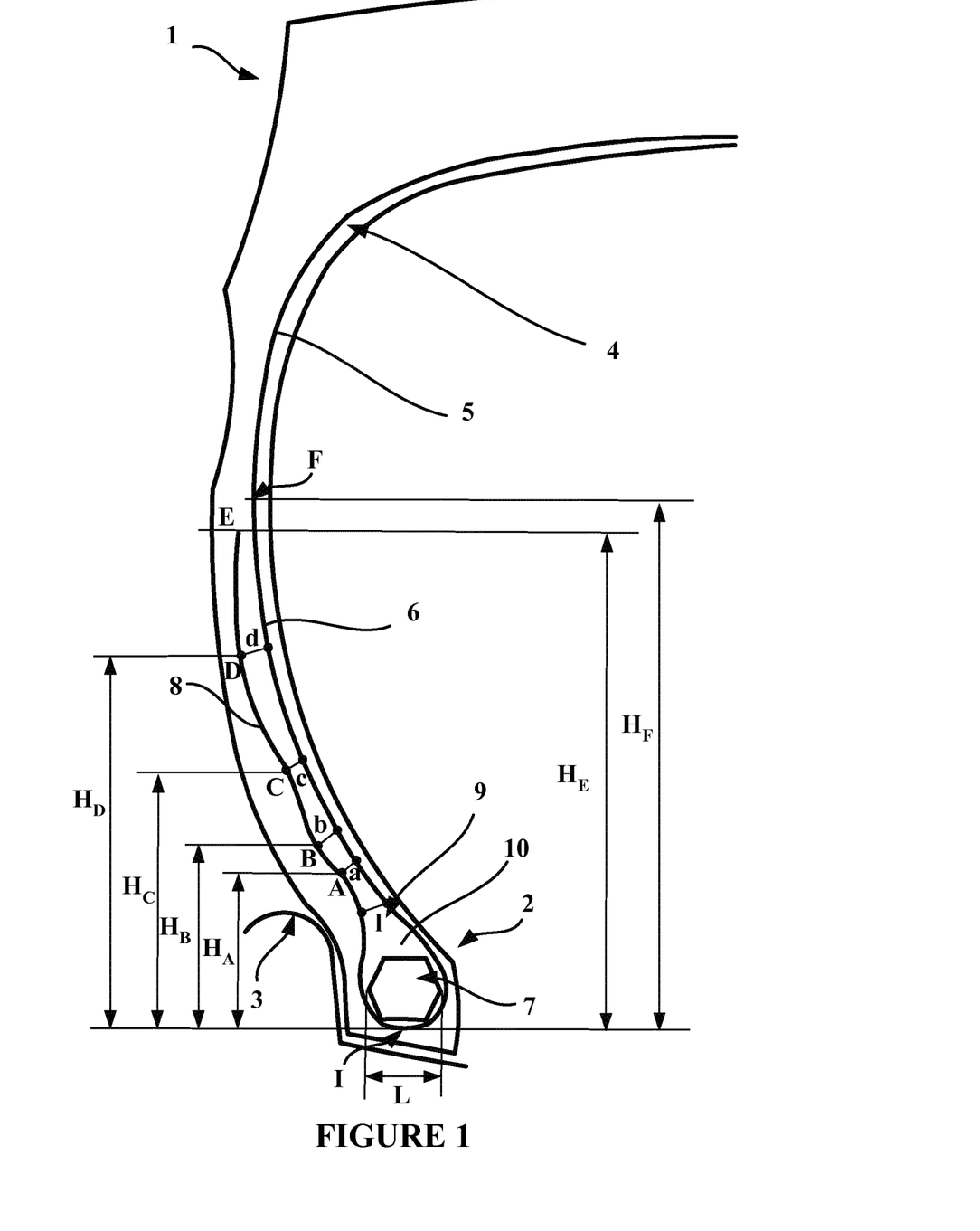
FIG. 1 is a half view in cross section, on a meridian plane, of a tire for a heavy vehicle of the construction plant type, according to a first embodiment of the invention.

FIG. 1 depicts a half view in cross section on a meridian plane of a tire 1 for a heavy vehicle of the construction plant type according to a first embodiment of the invention. The tire 1 comprises a bead 2 intended to come into contact with a rim 3 and a carcass reinforcement 4 comprising a single carcass layer 5. The carcass layer 5 comprises a main part 6 wrapped, in the bead 2, axially from the inside towards the outside of the tire, around a bead wire 7 having a diameter L, to form a turnup 8 having a free end E. The bead 2 comprises a filling element 9 comprising a filling compound 10 and extending radially towards the outside from the bead wire 7 and axially between the turnup 8 and the main part 6. The distance 1 between the turnup 8 and the main part 6 decreases continuously from the bead wire 7 as far as a first minimum distance a reached at a first point A of the turnup 8, then increases continuously from the first point A of the turnup 8 as far as a first maximum distance b reached at a second point B of the turnup 8. According to the invention, the distance 1 between the turnup 8 and the main part 6 then decreases continuously from the second point B of the turnup 8 as far as a second minimum distance c reached at a third point C of the turnup 8 radially on the inside of the free end E of the turnup 8, then the distance 1 between the turnup 8 and the main part 6 increases continuously from the third point C of the turnup 8 as far as a second maximum distance d reached at a fourth point D of the turnup 8 radially on the inside of the free end E of the turnup 8. The first, second, third and fourth points A, B, C and D of the turnup 8 are respectively radially positioned on the outside of a radially innermost point I of the bead wire 7 at radial distances $H_A$, $H_B$, $H_C$ and $H_D$. The free end E of the turnup 8 is positioned radially on the outside of the radially innermost point I of the bead wire 7 at a radial distance $H_E$.

Figure 2:
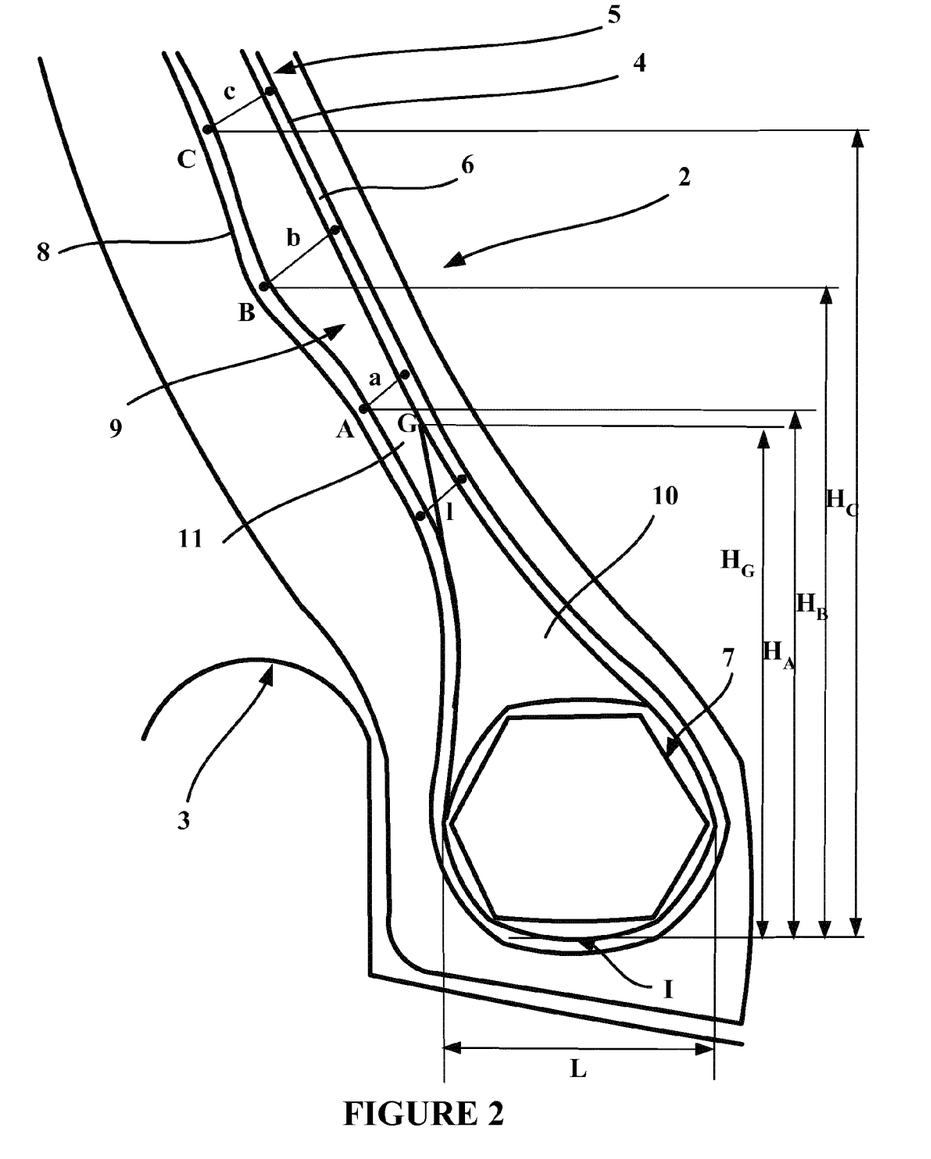
FIG. 2 is a view in cross section, on a meridian plane, of the bead of a tire for a heavy vehicle of the construction plant type, according to a second embodiment of the invention.

FIG. 2 shows a view in cross section on a meridian plane of the bead 2 of a tire for a heavy vehicle of the construction plant type, according to a second embodiment of the invention. The second embodiment in FIG. 2 differs from the first embodiment of FIG. 1 by a filling element 9 comprising a first filling compound 10 and a second filling compound 11 at least partially in contact with one another. The first filling compound 10 extends radially towards the outside from the bead wire 7 as far as a radially outermost point G of the first filling compound and in contact with the main part 6. The point G which is radially furthest towards the outside of the first filling compound 10 and in contact with the main part 6 is positioned radially on the outside of the radially innermost point I of the bead wire 7 at a radial distance $H_G$.

Figure 3:
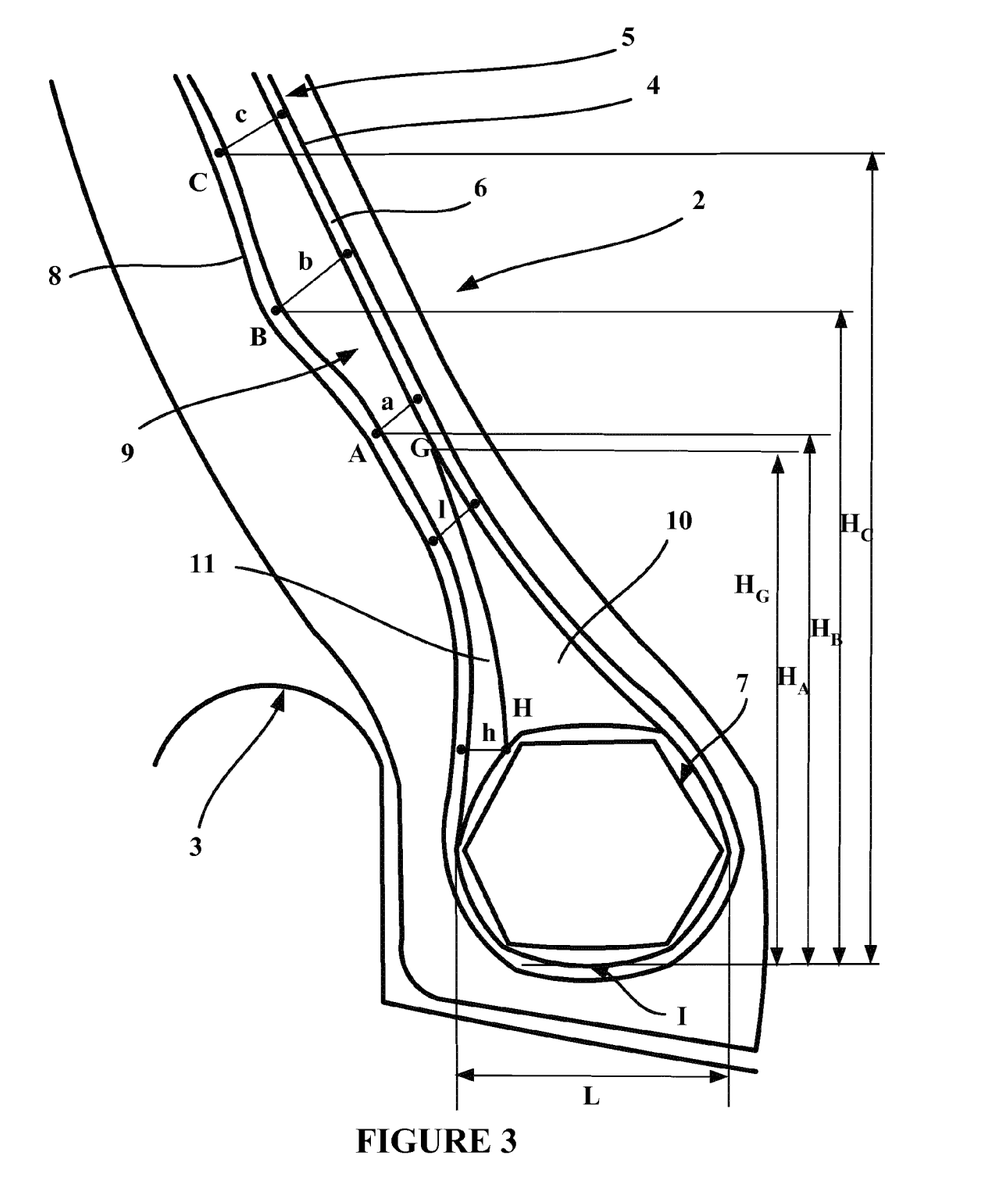
FIG. 3 is a view in cross section, on a meridian plane, of the bead of a tire for a heavy vehicle of the construction plant type, according to a third embodiment of the invention.

FIG. 3 shows a view in cross section, on a meridian plane, of the bead 2 of a tire for a heavy vehicle of the construction plant type according to a third embodiment of the invention. The third embodiment of FIG. 3 differs from the second embodiment of FIG. 2 by a filling element 9 comprising a second filling compound 11 extending radially towards the outside from the bead wire 7, along the turnup 8, and axially towards the inside from the turnup 8, in contact with the bead wire 7. The point H of the second filling compound 11, which is axially furthest towards the inside and in contact with the bead wire 7, is at an axial distance h from the turnup 8.

The invention has been studied in particular in the case of a tire of size 59/80R63 for a large dumper, according to the third embodiment of the invention as depicted in FIG. 3. The bead wire 7 of the tire has a diameter L equal to 9 cm. The filling element 9 comprises a first and a second filling compound (10, 11), of which the respective moduli of elasticity at 10% elongation are equal to 9.5 MPa and 6 MPa. The first, second, third and fourth points A, B, C and D of the turnup 8 are radially positioned on the outside of the radially innermost point I of the bead wire 7 at radial distances $H_A$, $H_B$, $H_C$ and $H_D$ respectively equal to 17.5 cm, 20 cm, 22 cm and 30 cm. The distance a, b, c and d, measured between the turnup 8 and the main part 6 at the points A, B, C and D of the turnup 8, i.e. the thicknesses of the filling element at these points, are respectively equal to 10 mm, 20 mm, 17 mm and 22 mm.

Simulations by finite element calculation performed on the tire described hereinabove have shown that the shear loadings in the three sensitive regions identified previously were appreciably reduced in comparison with the reference tire of the prior art.

The invention is not restricted to the features described hereinabove and may be extended to other bead configurations comprising, for example, and nonlimitingly:
one or more filling compounds axially interposed between the first and second filling compounds,
a radial stack of more than two filling compounds.

The invention claimed is:

1. A tire for a heavy vehicle of the construction plant type, comprising two beads intended to come into contact with a rim and connected to one another by a carcass reinforcement comprising at least one carcass layer,
    wherein the or each carcass layer comprises a main part wrapped, in each bead, axially from the inside towards the outside of the tire, around a bead wire having a diameter, to form a turnup having a free end,
    wherein each bead comprises a filling element extending radially towards the outside from the bead wire and axially between the turnup and the main part, the filling element comprising a first filling compound and a second filling compound at least partially in contact with one another, with the first filling compound extending radially towards the outside from the bead wire as far as a radially outermost point of the first filling compound and in contact with the main part, the point being radially positioned on the outside of a radially innermost point of the bead wire at a radial distance, the second filling compound extending radially towards the outside from the bead wire, along the turnup, and axially towards the inside from the turnup, in contact with the bead wire,
    wherein the distance between the turnup and the main part decreases continuously from the bead wire as far as a first minimum distance reached at a first point of the turnup, then increases continuously from the first point of the turnup as far as a first maximum distance reached at a second point of the turnup,
    wherein the distance between the turnup and the main part decreases continuously from the second point of the turnup as far as a second minimum distance reached at a third point of the turnup radially on the inside of the free end of the turnup,
    wherein the distance between the turnup and the main part increases continuously from the third point of the turnup as far as a second maximum distance reached at a fourth point of the turnup that is radially on the inside of the free end of the turnup, and
    wherein the radial distance between the radially outermost point, of the first filling compound and in contact with the main part, and the radially innermost point of the bead wire is at most equal to the radial distance between the first point of the turnup, corresponding to the first minimum distance, and the radially innermost point of the bead wire.

2. The tire for a heavy vehicle of the construction plant type of claim 1, wherein the first minimum distance reached at the first point of the turnup is at most equal to the second minimum distance reached at the third point of the turnup.

3. The tire for a heavy vehicle of the construction plant type of claim 1, wherein the first minimum distance reached at the first point of the turnup is at least equal to 0.1 times and at most equal to 0.2 times the diameter of the bead wire.

4. The tire for a heavy vehicle of the construction plant type of claim 1,
    wherein, the first point of the turnup being radially positioned on the outside of a radially innermost point of the bead wire at a radial distance, and
    wherein the radial distance between the first point of the turnup and the radially innermost point of the bead wire is at least equal to 1.5 times and at most equal to 2 times the diameter of the bead wire.

5. The tire for a heavy vehicle of the construction plant type of claim 1, wherein the first maximum distance reached at the second point of the turnup is at least equal to 1.2 times and at most equal to 2.5 times the first minimum distance reached at the first point of the turnup.

6. The tire for a heavy vehicle of the construction plant type of claim 1,
    wherein the second point of the turnup is radially positioned on the outside of a radially innermost point of the bead wire at a radial distance, and
    wherein the radial distance between the second point of the turnup and the radially innermost point of the bead wire is at least equal to 1.55 times and at most equal to 2.2 times the diameter of the bead wire.

7. The tire for a heavy vehicle of the construction plant type of claim 1, wherein the second minimum distance reached at the third point of the turnup is at least equal to 1 times and at most equal to 2.4 times the first minimum distance reached at the first point of the turnup.

8. The tire for a heavy vehicle of the construction plant type of claim 1,
    wherein the third point of the turnup is radially positioned on the outside of a radially innermost point of the bead wire at a radial distance, and
    wherein the radial distance between the third point of the turnup and the radially innermost point of the bead wire is at least equal to 1.8 times and at most equal to 2.5 times the diameter of the bead wire.

9. The tire for a heavy vehicle of the construction plant type of claim 1,
    wherein, the fourth point of the turnup is radially positioned on the outside of the radially innermost point of the bead wire at a radial distance, and
    wherein the radial distance between the fourth point of the turnup and the radially innermost point of the bead wire is at least equal to 1.5 times the radial distance between the first point of the turnup and the radially innermost point of the bead wire.

10. The tire for a heavy vehicle of the construction plant type of claim 1,
    wherein the free end of the turnup is positioned radially on the outside of the radially innermost point of the bead wire at a radial distance,
    wherein the axially outermost point of the main part is positioned radially on the outside of the radially innermost point of the bead wire at a radial distance, and
    wherein the radial distance between the free end of the turnup and the radially innermost point of the bead wire is at least equal to 0.8 times the radial distance between the axially outermost point, of the main part, and the radially innermost point of the bead wire.

11. The tire for a heavy vehicle of the construction plant type of claim 1, wherein the first filling compound has an elastic modulus at 10% elongation at least equal to the elastic modulus at 10% elongation of the second filling compound.

12. The tire for a heavy vehicle of the construction plant type of claim 1,
wherein the axially innermost point of the second filling compound, that is also in contact with the bead wire, is axially positioned on the inside of the turnup at an axial distance, and
wherein the axial distance between the axially innermost point of the second filling compound, that is also in contact with the bead wire, and the turnup is at least equal to 0.15 times and at most equal to 0.35 times the diameter of the bead wire.

13. The tire for a heavy vehicle of the construction plant type of claim 1,
wherein the or each carcass layer is made up of mutually parallel reinforcers coated in a coating compound, and
wherein the elastic modulus at 10% elongation of the second filling compound is at least equal to 0.75 times the elastic modulus at 10% elongation of the coating compound.

14. The tire for a heavy vehicle of the construction plant type of claim 13, wherein the second filling compound has the same chemical composition as the coating compound.

15. The tire for a heavy vehicle of the construction plant type of claim 13, wherein the elastic modulus at 10% elongation of the second filling compound is at least equal to the elastic modulus at 10% elongation of the coating compound.

* * * * *